United States Patent [19]

Bartley

[11] 4,244,463
[45] Jan. 13, 1981

[54] CONVEYOR APPARATUS

[75] Inventor: Thomas S. Bartley, Mobile, Ala.

[73] Assignee: V-V Systems, Inc., Minneapolis, Minn.

[21] Appl. No.: 58,612

[22] Filed: Jul. 18, 1979

[51] Int. Cl.³ .............................................. B65G 65/28
[52] U.S. Cl. .................................... 198/508; 198/518; 198/723
[58] Field of Search ............... 198/508, 518, 519, 520, 198/723; 414/144

[56] References Cited

U.S. PATENT DOCUMENTS

| 2,146,061 | 2/1939 | Fasmer | 198/723 |
| 2,354,325 | 7/1944 | McMullin | 198/723 X |
| 3,401,787 | 9/1968 | Vaka | 198/723 |
| 3,472,357 | 10/1969 | Ströcker | 198/508 |

Primary Examiner—James L. Rowland
Attorney, Agent, or Firm—Walker & McKenzie

[57] ABSTRACT

A conveyor apparatus for conveying loose bulk material such as gravel and other granular materials from an in-feed location to an out-feed location. The apparatus includes a body for rotating about a vertical axis and a plurality of wings fixedly attached to the body and extending radially outward from the vertical axis. A portion of the wings is positioned substantially adjacent the in-feed location. Another portion of the wings is positioned substantially adjacent the out-feed location. Rotation of the body causes the wings to rotate and to convey the loose bulk material from the in-feed location to the out-feed location.

8 Claims, 8 Drawing Figures

CONVEYOR APPARATUS

BACKGROUND OF THE INVENTION

1. Field of the Invention:

The present invention relates in general to apparatuses for conveying loose bulk material such as gravel or the like.

2. Description of the Prior Art:

Heretofore, various apparatuses for conveying loose bulk material have been developed. See, for example, Meissner, U.S. Pat. No. 2,750,023; Ziegenbein, U.S. Pat. No. 3,338,432; Strocker, U.S. Pat. No. 3,472,357; Fischer, U.S. Pat. No. 3,509,985; Austin, U.S. Pat. No. 3,586,152; Althoff, U.S. Pat. 4,037,735; and Gehring, U.S. Pat. No. 4,120,408. None of the above patents disclose or suggest the present invention.

SUMMARY OF THE INVENTION

The present invention is directed towards improving prior methods of and apparatuses for conveying loose bulk material. The concept of the present invention is to provide a rotating body member with a plurality of radially extending wing members which convey loose bulk material in a carousel-like fashion from an in-feed location to an out-feed location. One objective of the present invention is to provide such a conveyor apparatus which prevents the material being conveyed from bridging or plugging-up of various discharge ports and the like. Another objective of the present invention is to provide such a conveyor apparatus which can be applied as a metering device by means of variable speed or flow gates, or a combination of both possibly in conjunction with variable material supply. Another objective of the present invention is to provide such a conveyor apparatus with strong and heavy reclaimer boom digging or dragging devices to be used in areas with frozen bulk material piles.

The conveyor apparatus of the present invention is comprised of, in general, a body means for rotating about a vertical axis and a plurality of wing means fixedly attached to the body means and extending radially outward from the vertical axis about which the body means rotates. The wing means has a portion positioned substantially adjacent a first location and has a portion positioned substantially adjacent a second location. Rotation of the body means causes the wing means to rotate and to convey loose bulk material from the first location to the second location.

DESCRIPTION OF THE PREFERRED EMBODIMENT

Figure 2:
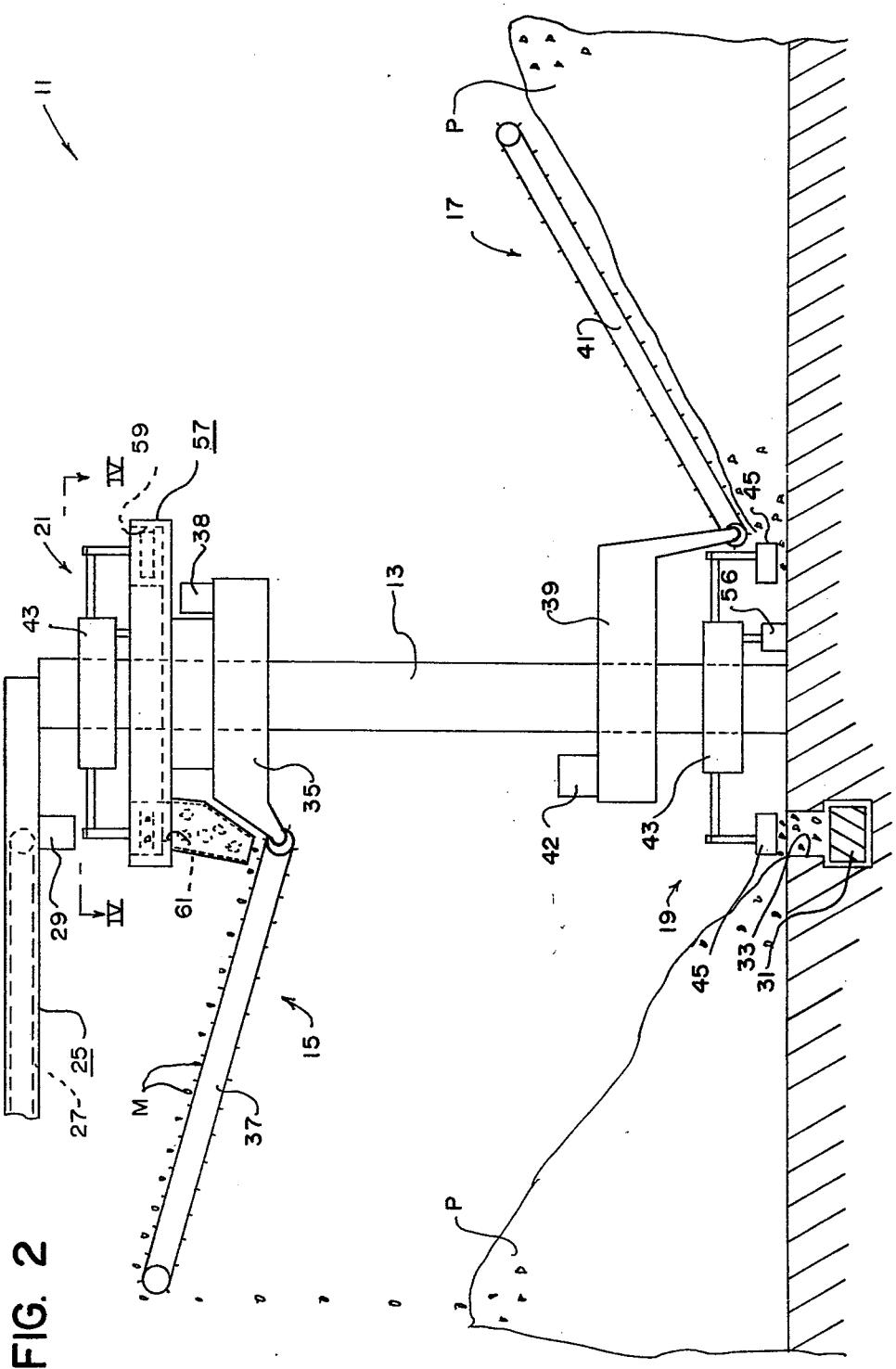
FIG. 2 is a partially sectional, enlarged and somewhat schematic side elevational view of a portion thereof.
Figure 3:
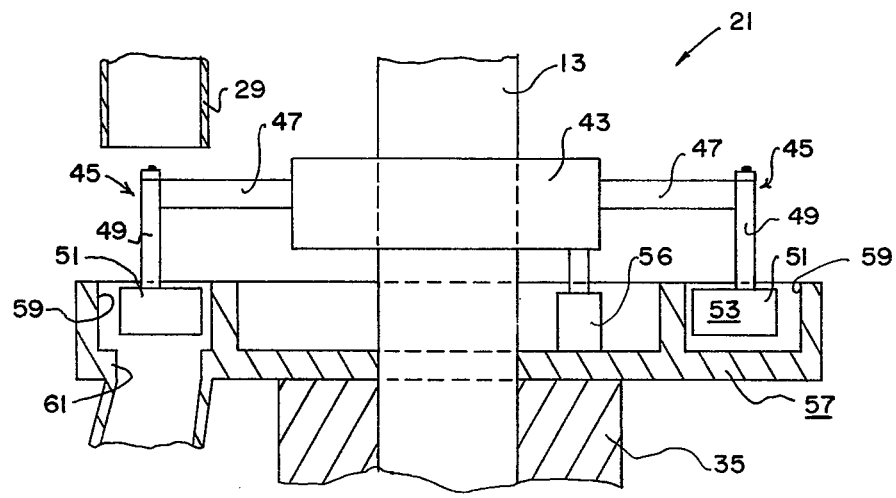
FIG. 3 is an enlarged sectional view of a portion thereof.
Figure 4:
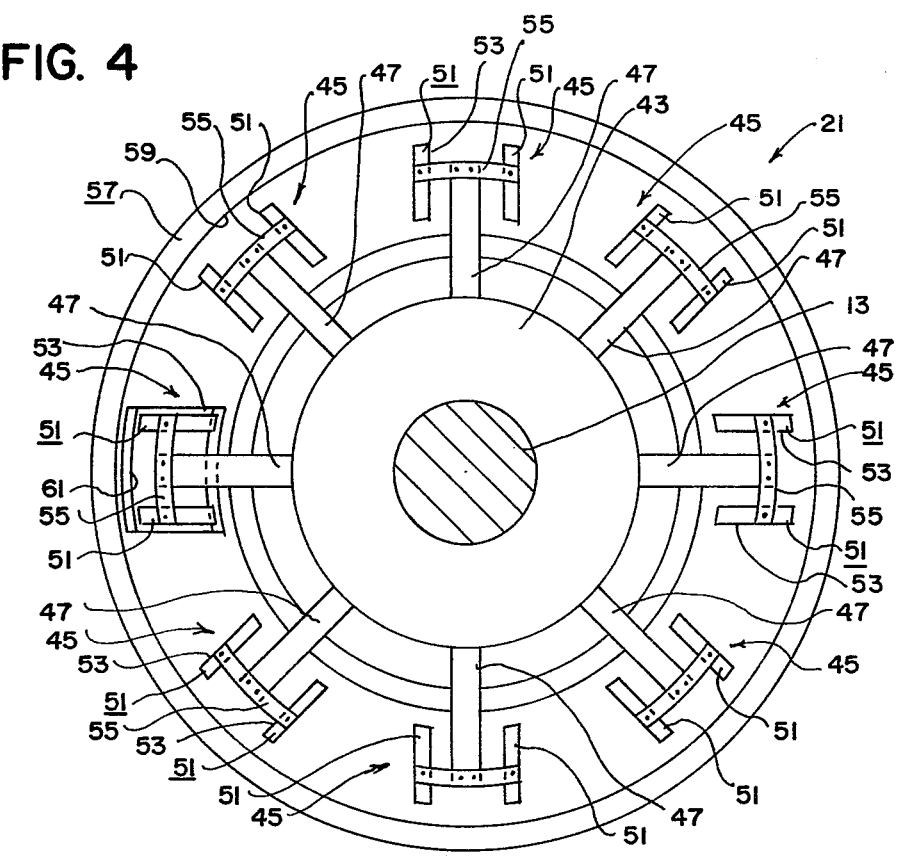
FIG. 4 is an enlarged sectional view as taken on line IV—IV of FIG. 2 with portions thereof removed for clarity.
Figure 5:
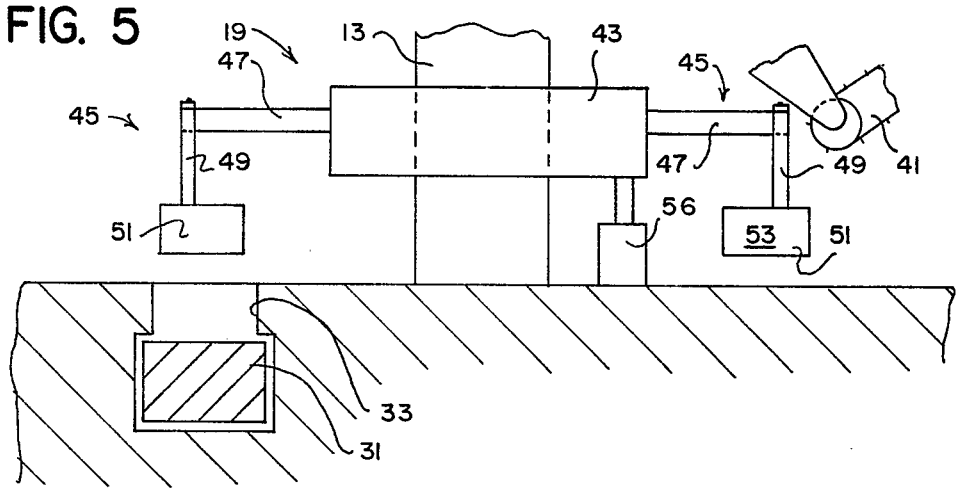
FIG. 5 is an enlarged sectional view of a portion thereof.
Figure 6:
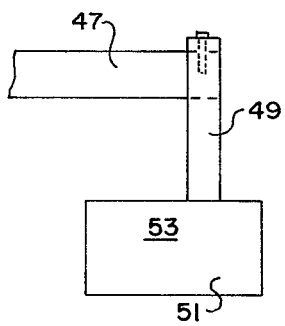
FIG. 6 is an enlarged side elevational view of a portion of the wing means thereof.

The conveyor apparatus 11 of the present invention is for conveying loose bulk material M such as gravel or other granular or fine materials from a first or in-feed location to a second or out-feed location. The preferred embodiment of the present invention includes a vertical column means 13, a stacker means 15 rotatably attached to the vertical column means 13, a reclaimer means 17 rotatably attached to the vertical column means 13, a first wing feeder means 19 rotatably attached to the vertical column means 13, and a second wing feeder means 21 rotatably attached to the vertical column means 13 (see, in general, FIG. 2).

The vertical column means 13 is preferably erected at the center point of a circular storage yard. A ring-like wall means 23 may surround the vertical column means 13 for defining the outerboundary of the circular storage yard (see FIG. 1). The vertical column means 13 and ring-like wall means 23 may be constructed in any manner apparent to those skilled in the art.

An in-feed conveyor means is associated with the vertical column means 13 to provide an in-feed location for the loose bulk material M substantially at the upper end of the vertical column means 13. The in-feed conveyor means may be of any type apparent to those skilled in the art. For example, the in-feed conveyor means may consist of a bucket-like elevator means (not shown) located within the vertical column means 13 for conveying loose bulk material from a location beneath the vertical column means to an in-feed location substantially adjacent the upper end of the vertical column means 13. On the other hand, the in-feed conveyor means may consist of an overhead conveyor means 25 extending from a location outside the ring-like wall means 23 to a location adjacent the upper end of the vertical column means 13 as clearly shown in FIGS. 1 and 2. The overhead conveyor means 25 may include an endless belt conveyor 27 for conveying loose bulk material M from a location outside the ring-like wall means 23 to a location substantially adjacent the second wing feeder means 21. More specifically, the overhead conveyor means 25 preferably has a discharge chute 29 located substantially adjacent a portion of the second wing feeder means 21 to define an in-feed location and to discharge loose bulk material M onto a portion of the second wing feeder means 21.

Figure 1:
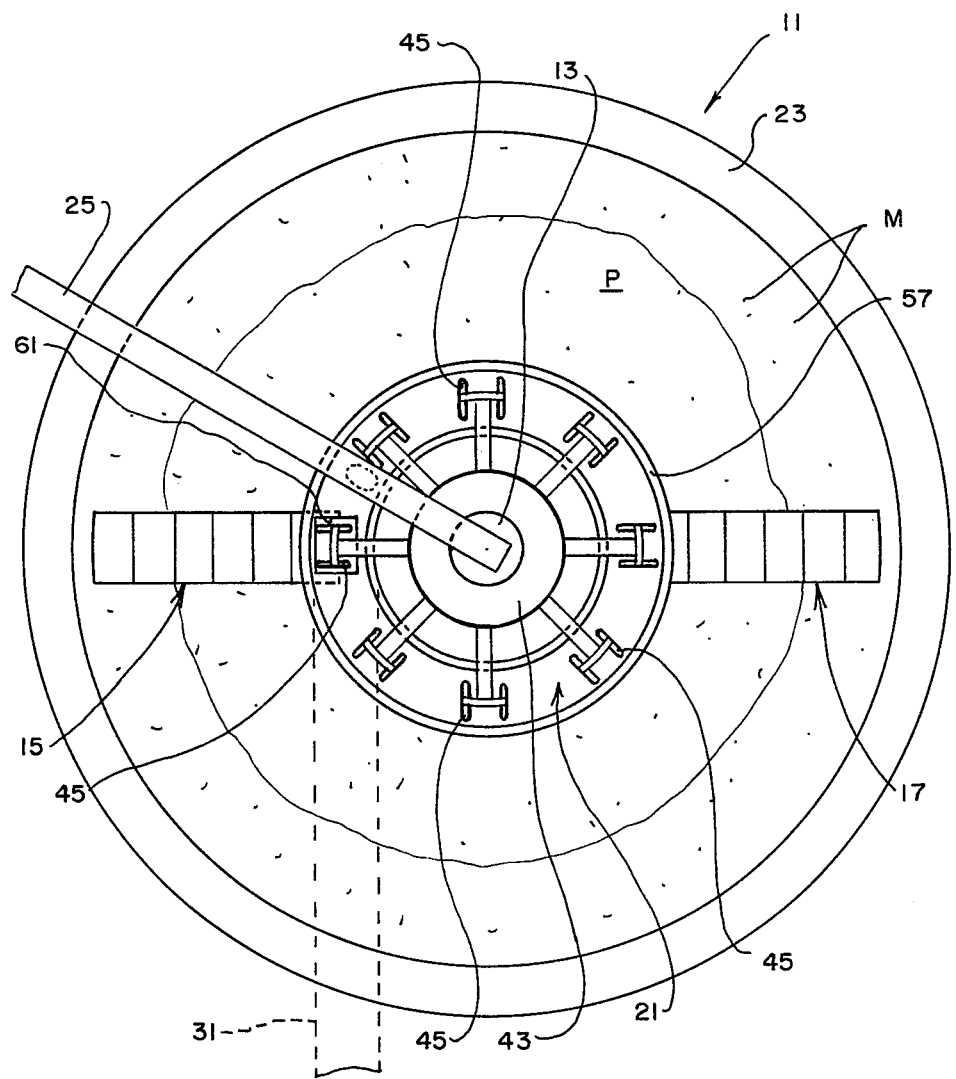
FIG. 1 is top plan view of the conveyor apparatus of the present invention.

An out-feed conveyor means 31 is associated with the conveyor apparatus 11 for receiving loose bulk material M reclaimed by the reclaimer means 17. The out-feed conveyor means may be of any construction and type apparent to those skilled in the art. For example, the out-feed conveyor means may consist of an underground conveyor 31 located beneath a portion of the first wing feeder means 19 and extending from a location substantially adjacent the first wing feeder means 19 to a location outside the ring-like wall means 23 as shown in FIG. 1. An aperture 33 allows loose bulk material M to fall onto the underground conveyor 31 and defines the out-feed location of the present invention.

The stacker means 15 may be of any construction apparent to those skilled in the art. In general, the stacker means 15 includes a body portion 35 rotatably mounted to the vertical column means 13 in any manner apparent to those skilled in the art and includes a conveyor assembly 37 attached to the body portion 35 and extending outwardly therefrom for conveying loose bulk material M being discharged from the overhead conveyor means 25 into a substantially circular storage pile P. The end of the conveyor assembly 37 adjacent the body portion 35 defines a loading location of the stacker means 15 while the opposite end thereof defines a discharge location. The stacker means 15 may be caused to rotate about the vertical column means 13 in any manner apparent to those skilled in the art such as by way of a motor means 38 which coacts with gear members or the like (not shown) attached to the vertical column means 13.

The reclaimer means 17 may likewise be of any construction apparent to those skilled in the art. More specifically, the reclaimer means 17 includes a body portion 39 rotatably mounted to the vertical column means 13 in any manner apparent to those skilled in the art and includes a conveyor assembly 41 attached to the body portion 39 and extending outwardly therefrom for reclaiming loose bulk material M from the storage pile P by scrapping loose bulk material M therefrom to thereby convey the loose bulk material M to a location adjacent the first wing feeder means 19. The end of the conveyor assembly 41 adjacent the body portion 39 defines a discharge location of the reclaimer means 17. The reclaimer means 17 may be caused to rotate about the vertical column means 13 in any manner apparent to those skilled in the art such as by way of a motor means 42 which coacts with gear members or the like (not shown) attached to the vertical column means 13.

Figure 7:
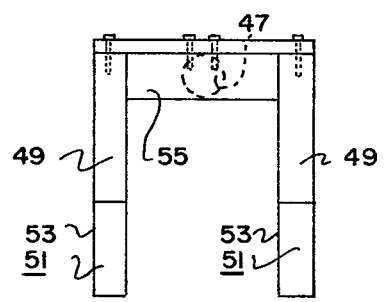
FIG. 7 is a side elevational view of FIG. 6.
Figure 8:
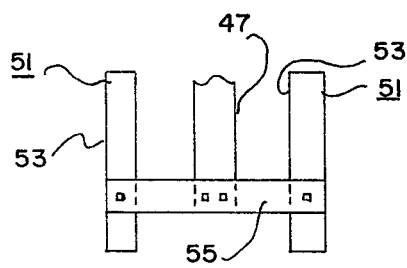
FIG. 8 is a top plan view of FIG. 7.

The first and second wing feeder means 19, 21 are substantially identical in construction. Thus, each wing feeder means 19, 21 includes a body means 43 rotatably attached to the vertical column means 13 by means well known to those skilled in the art and includes a plurality of wing means 45 fixedly attached to the body means 43 and extending radially outward of the vertical column means 13. Each wing means 45 preferably includes a leg member 47 extending radially outward of the associated body means 43, preferably includes a downwardly extending arm member 49 attached to the outer end of the leg member 47, and preferably includes a wing member 51 having an elongated plate-like face surface 53 and being attached to the lower end of the arm member 49 with the face surface 53 positioned substantially transverse to the direction of rotation thereof. Preferably a cross member 55 is attached to the outer end of each leg member 47 so as to form a tee at the outer end of each leg member 47 and a downwardly extending arm member 49 is attached to each end of the cross member with a wing member 51 attached to the lower end of each arm member 49 (see, in general, FIGS. 7 and 8). The wing feeder means 19, 21 may be caused to rotate about the vertical column means 13 in any manner apparent to those skilled in the art such as by way of a motor means 56 which coacts with gear member or the like (not shown) attached to the vertical column means 13.

A pan means 57 is attached to the body portion 35 of the stacker means 15 for rotation therewith and is positioned adjacent the second wing feeder means 21 for coacting with the second wing feeder means 21 to convey loose bulk material M from the in-feed location (i.e., the discharge chute 29) to the loading location of the stacker means 15. The pan means 57 has an upwardly opening circular trough portion 59 for receiving the wing members 51 of the second wing feeder means 21 and position so as to receive the loose bulk material M from the in-feed location (i.e., the discharge chute 29).

The circular trough portion 59 has an aperture 61 therein for allowing the second wing feeder means 21 to convey the loose bulk material M from the circular trough portion 59 to the loading location of the stacker means 15.

The operation of the conveyor apparatus 11 is as follows:

Loose material M is conveyed from an initial station outside the ring-like wall means 23 by the conveyor 27 and is discharged through the discharge chute 29 onto a portion of the second wing feeder means 21. Rotation of the second wing feeder means 21 about the vertical column means 13 will cause such loose bulk material M to be uniformly conveyed through the aperture 61 of the pan means 57 onto the loading location or lower end of the conveyor assembly 37 of the stacker means 15. Such loose bulk material M will then be carried up the conveyor assembly 37 and discharged therefrom into a circular storage pile P. Rotation of the stacker means 15 about the vertical column means 13 will cause the storage pile P to be shaped in the form of a complete or partial doughnut. When it is desired to reclaim loose bulk material M from the pile P, the reclaimer means 17 is activated to scrape or convey loose bulk material M onto a portion of the first wing feeder means 19. More specifically, the conveyor assembly 41 of the reclaimer means 17 is activated to move loose bulk material M to a portion of the first wing feeder means 19 while rotation of the reclaimer means 17 about the vertical column means 13 will cause the loose bulk material M to be reclaimed from the storage pile P in a substantially uniform manner. Rotation of the first wing feeder means 19 about the vertical column means 13 will cause such loose bulk material M to be uniformly conveyed through the out-feed location (i.e., the aperture 33) and onto the conveyor 31. The conveyor 31 will then convey the loose bulk material M to a final station outside the ring-like wall means 23. Rotation of the stacker means 15, reclaimer means 17, first wing feeder means 19, and second wing feeder 21 about the vertical column means is independent of one another and may be at varying speeds.

Although the invention has been described and illustrated with respect to a preferred embodiment thereof, it is not to be so limited since changes and modifications may be made therein which are within the full intended scope of the invention.

I claim:

1. A conveyor apparatus for conveying loose bulk material from a first location to a second location, said conveyor apparatus comprising:
    (a) body means for rotating about a vertical axis;
    (b) a plurality of wing means fixedly attached to said body means and extending radially outward from the vertical axis about which said body means rotates, said plurality of wing means having a portion positioned substantially adjacent said first location and having a portion positioned substantially adjacent said second location, rotation of said body means causing said wing means to rotate and to convey said loose bulk material from said first location to said second location;
    (c) a vertical column means about which said body means is rotatably attached; and
    (d) a stacker means rotatably attached to said vertical column means for conveying said loose bulk material from said second location to a substantially circular storage pile about said vertical column means.

2. A conveyor apparatus for conveying loose bulk material from a first location to a second location, said conveyor apparatus comprising:
   (a) body means for rotating about a vertical axis;
   (b) a plurality of wing means fixedly attached to said body means and extending radially outward from the vertical axis about which said body means rotates, said plurality of wing means having a portion positioned substantially adjacent said first location and having a portion positioned substantially adjacent said second location, rotation of said body means causing said wing means to rotate and to convey said loose bulk material from said first location to said second location;
   (c) a vertical column means about which said body means is rotatably attached, said loose bulk material being stored in a substantially circular storage pile about said vertical column means; and
   (d) a reclaimer means rotatably attached to said vertical column means for conveying said loose bulk material from said substantially circular storage pile to said first location.

3. A conveyor apparatus for conveying loose bulk material from an in-feed location to an out-feed location, said conveyor apparatus comprising:
   (a) vertical column means;
   (b) stacker means rotatably attached to said vertical column means for receiving loose bulk material from said in-feed location and for stacking said loose bulk material into a substantially circular storage pile about said vertical column means, said stacker means having a loading location substantially adjacent said in-feed location;
   (c) reclaimer means rotatably attached to said vertical column means for reclaiming said loose bulk material from said substantially circular pile, said reclaimer means having a discharge location substantially adjacent said vertical column means; and
   (d) wing feeder means including a body means for being rotatably attached to said vertical column means and including a plurality of wing means fixedly attached to said body means and extending radially outward of said vertical column means, said plurality of wing means having a portion positioned substantially adjacent said discharge location of said reclaimer means and having a portion positioned substantially adjacent said out-feed location, rotation of said body means causing said wing means to rotate and to convey loose bulk material from said discharge location of said reclaimer means to said out-feed location.

4. The conveyor apparatus of claim 3 in which is included a second wing feeder means, said second wing feeder means including a body means for being rotatably attached to said vertical column means and including a plurality of wing means fixedly attached to said body means and extending radially outward of said vertical column means, said plurality wing means of said second wing feeder means having a portion positioned substantially adjacent said in-feed location and having a portion positioned substantially adjacent said loading location of said stacker means, rotation of said body means of said second wing feeder means causing said wing means thereof to rotate and to convey said loose bulk material from said in-feed location to said loading location of said stacker means.

5. The conveyor apparatus of claim 4 in which each of said plurality of wing means includes a leg member extending radially outward of the associated said body means, includes a downwardly extending arm member attached to the outer end of said leg member, and includes a wing member having an elongated plate-like face surface and being attached to the lower end of said arm member with said face surface positioned substantially transverse to the direction to rotation thereof.

6. The conveyor apparatus of claim 5 in which each of said plurality of wing means includes a second downwardly extending arm member attached to the outer end of said leg member thereof, and includes a second wing member having an elongated plate-like face surface and being attached to the lower end of said arm member with said face surface positioned substantially transverse to the direction of rotation thereof; and in which the outer end of said leg member of each of said plurality of wing means forms a tee with said arm members of said wing means attached to opposite ends of said tee.

7. The conveyor apparatus of claim 6 in which is included a ring-like wall means surrounding said vertical column means and spaced radially therefrom for enclosing the outer periphery said substantially circular storage pile.

8. The conveyor apparatus of claim 7 in which is included a pan means attached to said stacker means for rotation therewith and positioned adjacent said second wing feeder means for coacting with said second wing feeder means to convey loose bulk material from said in-feed location to said loading location of said stacker means, said pan means having an upwardly opening circular trough portion for receiving said wing members of said second wing feeder means, said circular trough portion being positioned so as to receive said loose bulk material from said in-feed location, said circular trough portion having an aperture therein for allowing said second wing feeder means to convey said loose bulk material from said circular trough portion to said loading location of said stacker means.

* * * * *